Aug. 4, 1964   E. RIEGLER   3,142,861
APPARATUS FOR SHIRRING SAUSAGE CASINGS
Filed Aug. 20, 1962

INVENTOR.
ERNST RIEGLER
BY
James E. Bryan
ATTORNEY

3,142,861
APPARATUS FOR SHIRRING SAUSAGE CASINGS
Ernst Riegler, Niederwalluf, Rheingau, Germany, assignor to Kalle Aktiengesellschaft, Wiesbaden, Biebrich, Germany
Filed Aug. 20, 1962, Ser. No. 218,805
Claims priority, application Germany Aug. 24, 1961
5 Claims. (Cl. 17—42)

This invention relates to an apparatus for shirring sausage casings.

Sausage casings are sometimes prepared in shirred form for the purpose of handling them more satisfactorily on sausage filling machines, i.e. they are so compressed, with the formation of creases, that a more or less stiffened hollow bellows-like body is formed from the sausage casing. For filling with the sausage filling material, the hollow bellows-like body is then placed on the filling nozzle of a filling machine.

Several methods and arrangements used for shirring sausage casings are known. Thus, the sausage casing, which is inflated if necessary, can be either compressed manually or pushed over a mandrel and caused to be compressed between parallel-guided parts of revolving endless belts or chains provided with claws or finger-like projections. Methods are also known in which the sausage casings are compressed by means of profiled wheels.

In these known methods, the feed is produced by those sides or edges of the fingers, claws or profiled parts which are located at the front in the direction of movement, after the sausage casing has already been deformed in undulating fashion before compression. In this method of shirring sausage casings, damage may occur at the bulging or rounded-out parts of the sausage casing owing to the feed pressure exerted. Moreover, at the end of the conveying action, performed by means of the fingers or profiled grooves, some degree of chafing always takes place between the sausage casing and the fingers or profiled grooves owing to the latter being turned out of the conveying direction. Attempts have been made to alleviate this drawback by suitably controlled sudden turning away of the fingers, but it has not been possible to eliminate it completely and it has been necessary to accept other drawbacks, in particular increased susceptibility of the shirring device to breakdown.

The present invention provides an apparatus for shirring sausage casings in which a casing is moved toward a fixed point by translational motion alternately supplied to opposite sides of the casing. The casing is supported on a form of desired configuration and may be inflated.

The invention further provides an apparatus for performing the above method, including a mandrel affixed to an abutment, a pair of peripherally grooved rolls oppositely disposed with respect to the axis of the mandrel and means for advancing a sausage casing towards the abutment by rotating the rolls in opposite directions and causing them to simultaneously reciprocate in a direction normal to the mandrel axis. Preferably, the mandrel is hollow, means are provided for passing air through it into the casing and a pair of nip rolls is provided for confining the air in the casing.

The advancement means of the shirring apparatus of the invention is free from the formerly used claws, fingers or other projecting parts so that the above-mentioned disadvantages associated with such components are avoided.

The grooves of the rolls facing the mandrel are of uniform cross-section and are shaped according to the desired form of the cross-section of the shirred casing, for example in a manner such as to form a round, oval, square, rhombic, rectangular or polygonal passage. It is of advantage to use two rolls having grooves of a substantially semi-circular cross-section by means of which a shirred sausage casing of circular cross-section is produced.

One embodiment of the apparatus of the invention is illustrated in the accompanying drawings in which.

Figure 1:
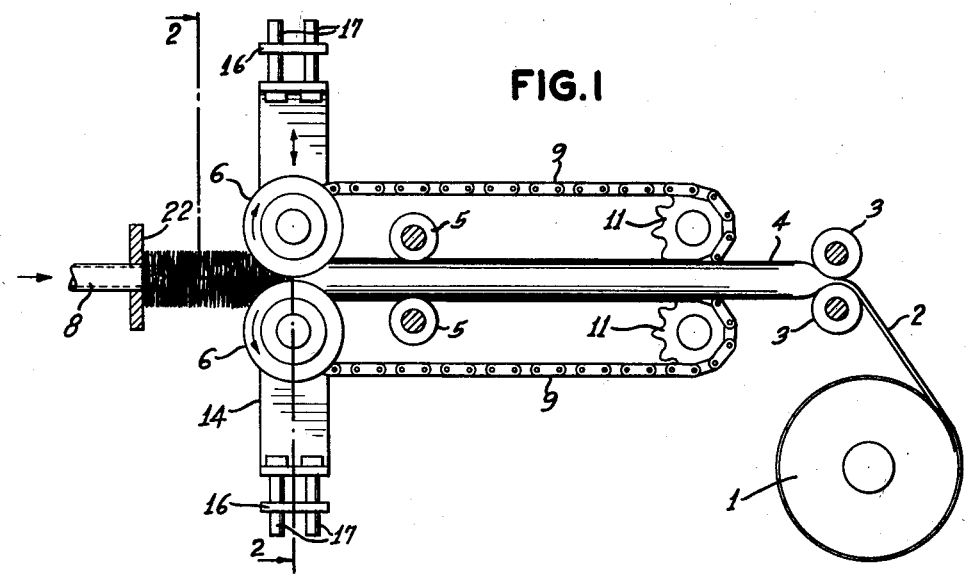
FIGURE 1 is a front elevation of the apparatus, partly in section.
Figure 2:
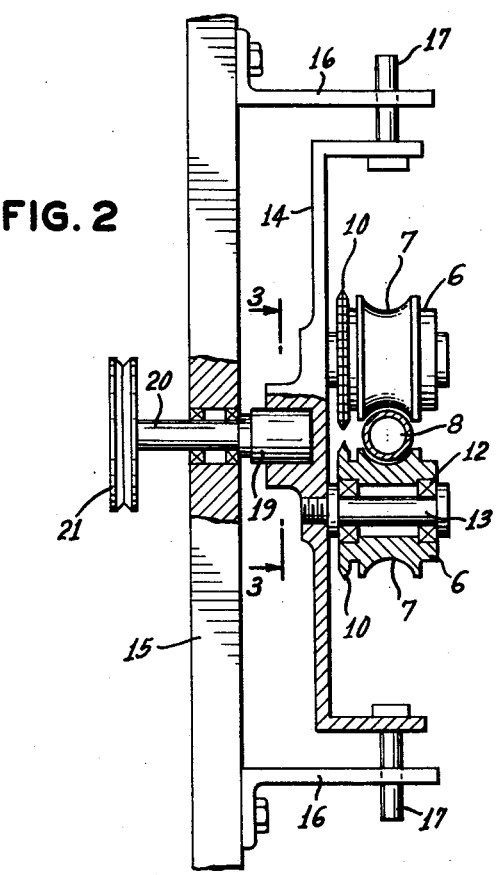
FIGURE 2 is an enlarged side elevation thereof, partly in section taken on the line 2—2 of FIGURE 1.
Figure 3:
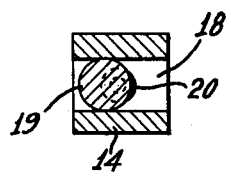
FIGURE 3 is a front elevation of a detail taken in section on the line 3—3 of FIGURE 2.

Referring to the drawings, a sausage casing 2, which is wound flat on a reel or drum 1, passes between a pair of nip rolls 3 and then, in the form of a tube 4, slightly inflated as described below, passes between two idling or driven supporting rolls 5. The tube is then drawn between two advancement rolls 6 each of which has a peripheral groove 7, as shown in FIGURE 2, and which are driven in opposite directions, so that they urge the slightly inflated tube 4 over the mandrel 8 and against the abutment 22. Air for inflation is passed through the mandrel, which is hollow. The tube 4 is continually displaced during its advance by the reciprocating motion of the two rolls 6 which occurs in a plane perpendicular, or normal, to the axis of the mandrel 8. The rotation of the rolls 6 about their axes is effected, for example, by the chains 9, the driven sprockets 10, mounted on the rolls 6, and the driving sprockets 11. In the embodiment illustrated in the drawings, the rolls 6 reciprocate in a vertical direction. The reciprocating motion may be produced by any desired means and, in the embodiment illustrated in the drawing, there is shown an assembly in which the rolls 6 are mounted by means of the bearings 12, on the shafts 13 which are, in turn, secured to a slide 14. The slide 14 runs smoothly in guides in the brackets 16 attached to the frame 15 by means of the four guide pins 17. The slide 14 has a groove 18 therein at right angles to the direction of reciprocation and in which rotates a cam 19 which is secured to a shaft 20 and is driven by means of a pulley 21 and a motor, not shown. Rotation of the cam 19 causes the rolls 6 to reciprocate; the frequency of the reciprocation can be adjusted independently of the feed rate of the casing.

The method according to the present invention and the apparatus for performing the same have the advantage that the sausage casing is very gently treated. The invention has extensive capacity for adaptation to the paritcular conditions obtaining, so that well shirred sausage casings are obtained relatively easily without impairing the strength of the casing to any appreciable extent. The shirring effected by the method according to the invention results in a shirred tube the folds of which are closely spaced and which thereby achieves optimum utilization of space. The laying together of the folds is effected in a steadily progressing rhythm, in the embodiment illustrated one of simple harmonic form, whereby the sausage casings are further protected from damage. By changing the nature of the reciprocating drive, for example by control by way of cam discs, the creasing can be effected according to a different steadily progressing rhythm, if so desired. When the eccentric is made adjustable, it is possible to shir sausage casings of all tube diameters within the given range of adjustability. Likewise it is possible, with a given pair of advancing rolls, to shir sausage casings having different diameters. For example, if a square is chosen as the cross-sectional shape of the shirred casing, the grooves in the rolls are then so formed that they each present a surface including a right angle, so that together they described a square channel.

It will be obvious to those skilled in the art that many modifications may be made within the scope of the present invention without departing from the spirit thereof, and the invention includes all such modifications.

What is claimed is:

1. An apparatus adapted for use in shirring sausage casings comprising a mandrel having an abutment affixed thereto, a pair of rolls mounted on opposite sides of the mandrel, means for rotating the rolls in opposite directions, and means for imparting reciprocating motion to the roll in a direction normal to the mandrel axis.

2. An apparatus according to claim 1 in which the mandrel has means for passing a fluid therethrough.

3. An apparatus according to claim 1 in which the rolls have grooves in the peripheries thereof.

4. An apparatus according to claim 1 in which means for imparting reciprocating motion to the rolls include a frame upon which the rolls are rotatably mounted.

5. An apparatus according to claim 1 in which a pair of nip rolls is mounted beyond the end of the mandrel.

References Cited in the file of this patent

UNITED STATES PATENTS

| | | |
|---|---|---|
| 2,819,488 | Gimbel | Jan. 14, 1958 |
| 2,983,949 | Matecki | May 16, 1961 |